(12) United States Patent
Yamada et al.

(10) Patent No.: US 11,393,344 B2
(45) Date of Patent: Jul. 19, 2022

(54) FLIGHT CONTROL APPARATUS AND FLIGHT CONTROL SYSTEM

(71) Applicant: NTT DOCOMO, INC., Tokyo (JP)

(72) Inventors: Takefumi Yamada, Tokyo (JP); Ken Koumoto, Tokyo (JP); Hidetoshi Ebara, Tokyo (JP); Youhei Oono, Toyko (JP); Yuichiro Segawa, Tokyo (JP); Yukiko Nakamura, Toyko (JP)

(73) Assignee: NTT DOCOMO, INC., Tokyo (JP)

( * ) Notice: Subject to any disclaimer, the term of this patent is extended or adjusted under 35 U.S.C. 154(b) by 212 days.

(21) Appl. No.: 16/624,011

(22) PCT Filed: Jul. 11, 2018

(86) PCT No.: PCT/JP2018/026166
§ 371 (c)(1),
(2) Date: Dec. 18, 2019

(87) PCT Pub. No.: WO2019/054029
PCT Pub. Date: Mar. 21, 2019

(65) Prior Publication Data
US 2020/0111372 A1    Apr. 9, 2020

(30) Foreign Application Priority Data

Sep. 15, 2017    (JP) .............................. JP2017-177929

(51) Int. Cl.
*G08G 5/00*    (2006.01)
*B64C 39/02*    (2006.01)
*G08G 5/04*    (2006.01)

(52) U.S. Cl.
CPC ......... *G08G 5/0039* (2013.01); *B64C 39/024* (2013.01); *G08G 5/0034* (2013.01);
(Continued)

(58) Field of Classification Search
CPC .. G08G 5/0039; G08G 5/0034; G08G 5/0069; G08G 5/045; G08G 5/0091;
(Continued)

(56) References Cited

U.S. PATENT DOCUMENTS 5,450,323 A * 9/1995 Maupillier ............ B64C 13/503
701/14
5,560,570 A * 10/1996 Pierson ................ G05D 1/0061
244/194
(Continued)

FOREIGN PATENT DOCUMENTS

JP    2003130677 A    5/2003
JP    2013067375 A    4/2013
(Continued)

OTHER PUBLICATIONS

Notice of Reasons for Refusal issued in corresponding Japanese Patent Application No. 2019-541922, dated Aug. 4, 2020.
(Continued)

*Primary Examiner* — Yonel Beaulieu
(74) *Attorney, Agent, or Firm* — MKG, LLC

(57) ABSTRACT

A flight control apparatus includes an acquisition unit that acquires a flight plan in which first flight conditions are described, and information that indicates a time limit set with respect to a position on a path along which an air vehicle is to fly. An arrival judging unit judges, based on the acquired information, whether or not the air vehicle has arrived at the position within the time limit. A condition determination unit determines a second flight condition if it is judged that the air vehicle has not arrived at the position within the time limit. A flight control unit controls flight of the air vehicle selectively adopts a first flight control method which follows the first flight conditions or a second flight
(Continued)

control method which follows the second flight condition based on a result obtained by the arrival judging unit.

20 Claims, 5 Drawing Sheets

(52) U.S. Cl.
CPC ........... *G08G 5/0069* (2013.01); *G08G 5/045* (2013.01); *B64C 2201/145* (2013.01)

(58) Field of Classification Search
CPC .. G08G 5/0043; G08G 5/0026; G08G 5/0013; G08G 5/00; B64C 39/024; B64C 2201/145; B64C 2201/14; B64C 39/02; G01C 21/26; G05D 1/00
See application file for complete search history.

(56) References Cited

U.S. PATENT DOCUMENTS

| | | | |
|---|---|---|---|
| 5,608,392 A * | 3/1997 | Faivre | G05D 1/0676 244/186 |
| 5,900,869 A * | 5/1999 | Higashio | G06F 3/038 715/751 |
| 5,956,017 A * | 9/1999 | Ishizawa | G06F 1/1654 345/156 |
| 6,112,141 A * | 8/2000 | Briffe | G01C 23/00 345/1.3 |
| 2013/0253738 A1 | 9/2013 | Fucke | |
| 2016/0019795 A1* | 1/2016 | Chircop | G08G 5/0039 701/3 |
| 2018/0239350 A1* | 8/2018 | Cantrell | G05D 1/0038 |
| 2021/0150914 A1* | 5/2021 | Yamada | G08G 5/0047 |
| 2021/0201685 A1* | 7/2021 | Han | G08G 5/0039 |

FOREIGN PATENT DOCUMENTS

| | | |
|---|---|---|
| JP | 2017007588 A | 1/2017 |
| JP | 2017065297 A | 4/2017 |

OTHER PUBLICATIONS

International Search Report issued in corresponding PCT Application No. PCT/JP2018/026166, dated Oct. 4, 2018, 4 pages.

* cited by examiner

| Departure point | Destination point | Waypoints | Waiting location | Flight path | Time limits | ... |
|---|---|---|---|---|---|---|
| P1 | P10 | P2 to P8 | P9 | R1 | P2: 13:30 P3:13:50 | ... |

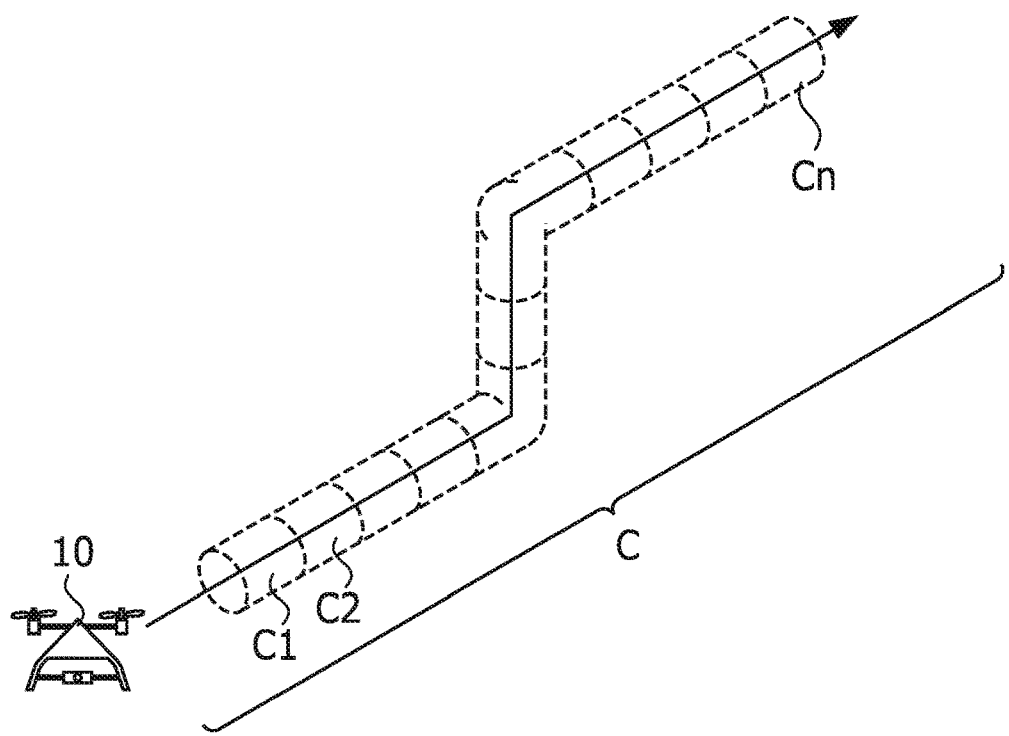
FIG. 8
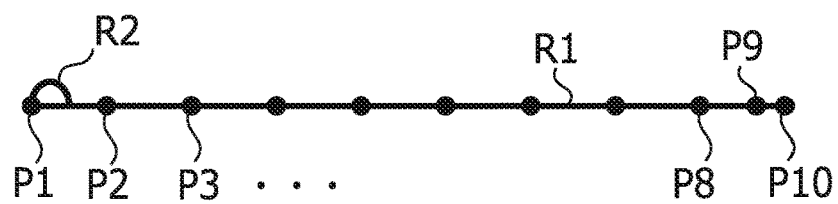
FIG. 9
| Judgment result | Control method |
| --- | --- |
| Air vehicle has arrived at waypoint within time limit | Operation management control |
| Air vehicle has not arrived at waypoint within time limit | Autonomous control |
FIG. 10

//www.w3.org/1999/xhtml">
FLIGHT CONTROL APPARATUS AND FLIGHT CONTROL SYSTEM

TECHNICAL FIELD

The present invention relates to a technique for controlling flight of air vehicles.

BACKGROUND ART

Techniques for controlling flight of air vehicles are known. For example, Japanese Patent Application No. JP 2017-65297A discloses that if, in a manual control mode, the speed or attitude of an air vehicle is excessive, it is judged that the air vehicle is in a state in which it is required to avoid danger, the manual operation is disabled, and the air vehicle is piloted automatically. Japanese Patent Application No. 2017-7588A discloses that if a control program running on a flight control apparatus is locked or runs away due to noise or a bug, and a driving module of an air vehicle goes out of control, the driving module will be switched from being controlled by the flight control apparatus in accordance with an instruction operation of an operator, to being autonomously controlled by an autonomous flight apparatus irrespective of an instruction operation of the operator.

SUMMARY OF INVENTION

Unmanned air vehicles such as drones includes an air vehicle that can fly according to a predetermined flight plan without being steered by a person. The flight plan is determined so that a plurality of air vehicles can fly without colliding with each other. Accordingly, if an air vehicle flies significantly behind planned time, the air vehicle may collide with a subsequent air vehicle, or may hinder the flight of the subsequent air vehicle.

The present invention aims to reduce, if an air vehicle cannot arrive at a position on a path within a time limit, the influence on a subsequent air vehicle.

According to the present invention, a flight control apparatus is provided that includes: an acquisition unit configured to acquire a flight plan in which first flight conditions are described, and information that indicates a time limit set with respect to a position on a path along which an air vehicle is to fly; an arrival judging unit configured to judge, based on the acquired information, whether or not the air vehicle has arrived at the position within the time limit; a condition determination unit configured to determine a second flight condition if it is judged that the air vehicle has not arrived at the position within the time limit; and a flight control unit configured to control flight of the air vehicle by selectively adopting a first flight control method which follows the first flight conditions or a second flight control method which follows the second flight condition based on a result obtained by the arrival judging unit.

The flight plan may include a first path and a destination point, and the condition determination unit may determine a second path directed toward the destination point, the second path being different from the first path.

The flight plan may include a destination point, and the condition determination unit may determine, of a plurality of paths directed toward the destination point, a path that passes through a predetermined airspace.

The flight plan may include a destination point, and if a predetermined condition is satisfied, the condition determination unit may change the destination point and may determine a new path directed toward the changed destination point.

A positioning unit configured to measure a position of the air vehicle may be further provided, wherein the flight plan may include a priority level that is added according to a flight purpose, and the predetermined condition may be a distance between the position measured by the positioning unit and the destination point, or a condition relating to the priority level.

According to the present invention, a flight control system is provided that includes: a setting unit configured to set a time limit with respect to a position on a path along which an air vehicle is to fly; an acquisition unit configured to acquire a flight plan in which first flight conditions are described, and information that indicates the set time limit; an arrival judging unit configured to judge, based on the acquired information, whether or not the air vehicle has arrived at the position within the time limit; a condition determination unit configured to determine a second flight condition if it is judged that the air vehicle has not arrived at the position within the time limit; and a flight control unit configured to control flight of the air vehicle by selectively adopting a first flight control method which follows the first flight conditions or a second flight control method which follows the second flight condition based on a result obtained by the arrival judging unit.

The setting unit may set the time limit based on flight performance of the air vehicle and a status of an airspace in which the air vehicle is to fly.

According to the present invention, it is possible to reduce, if an air vehicle cannot arrive at a position on a path within a time limit, the influence on a subsequent air vehicle.

BRIEF DESCRIPTION OF DRAWINGS

FIG. 8 is a diagram showing an example of an airspace, in accordance to the present invention.

FIG. 9 is a diagram showing an example of flight path R1, in accordance to the present invention.

FIG. 10 is a diagram showing an example of flight control according to a judgment result, in accordance to the present invention.

DETAILED DESCRIPTION

The following describes one embodiment of the present invention with reference to the drawings.

Configuration

Figure 1:
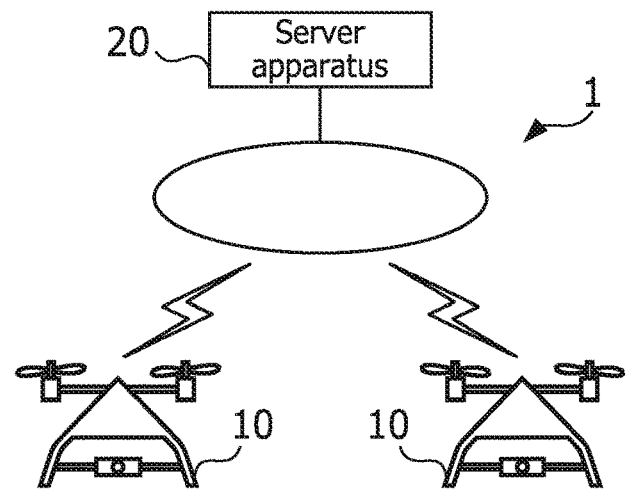
FIG. 1 is a diagram showing an example of a configuration of flight control system 1, in accordance to the present invention.

FIG. 1 is a diagram showing an example of a configuration of flight control system 1. Flight control system 1 is a system for controlling flight of air vehicles 10. Flight control system 1 includes multiple air vehicles 10 and server apparatus 20.

Figure 2:
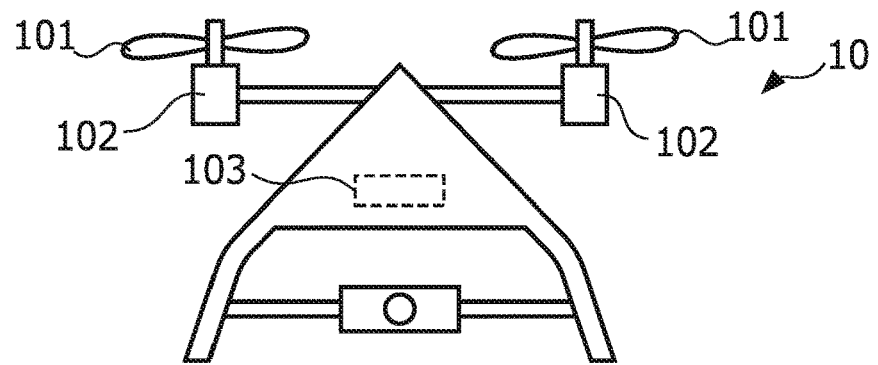
FIG. 2 is a diagram showing an example of outer appearance of air vehicle 10, in accordance to the present invention.

FIG. 2 is a diagram showing an example of the outer appearance of air vehicle 10. Air vehicle 10 is an unmanned aerial vehicle that can autonomously fly without being steered by a person. Air vehicle 10 is a drone, for example. Air vehicle 10 is provided with propellers 101, drive apparatuses 102, and battery 103.

Each propeller 101 rotates about a shaft. As a result of propellers 101 rotating, air vehicle 10 flies. Drive apparatuses 102 supply power to propellers 101 so that they rotate. Drive apparatuses 102 are motors, for example. Drive apparatuses 102 may be directly connected to propellers 101, or may be connected to propellers 101 via transmission mechanisms for transmitting power of drive apparatuses 102 to propellers 101. Battery 103 supplies electric power to the components of air vehicle 10 including drive apparatuses 102.

Figure 3:
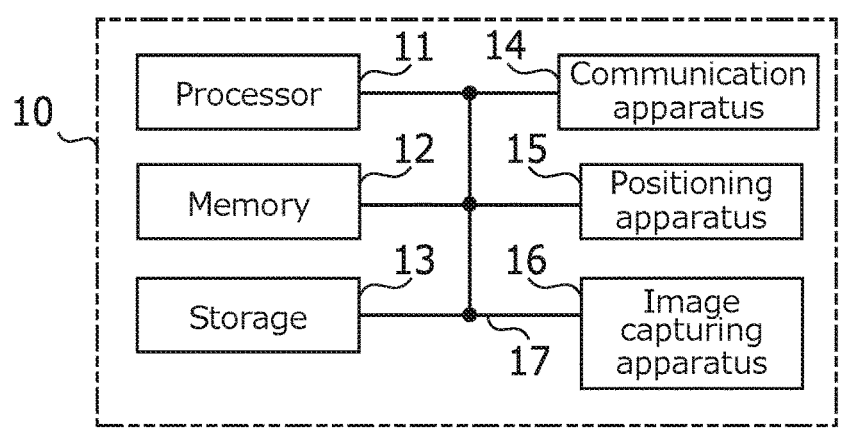
FIG. 3 is a diagram showing a hardware configuration of air vehicle 10, in accordance to the present invention.

FIG. 3 is a diagram showing a hardware configuration of air vehicle 10. Air vehicle 10 may also be physically configured as a computer device that includes processor 11, memory 12, storage 13, communication apparatus 14, positioning apparatus 15, image capturing apparatus 16, bus 17, and the like. Note that, in the following description, the term "apparatus" may be read as a circuit, a device, a unit, or the like.

Processor 11 activates, for example, an operating system to control the entire computer. Processor 11 may also be constituted by a central processing unit (CPU) that includes an interface with peripheral apparatuses, a control apparatus, an arithmetic apparatus, a register, and the like.

Furthermore, processor 11 reads a program (program code), a software module, or data onto memory 12 from storage 13 and/or communication apparatus 14, and executes various types of processing based thereon. As the program, a program for causing the computer to execute at least part of an operation of air vehicle 10 is used. The various types of processing that are executed in air vehicle 10 may be executed by one processor 11, or may be executed by two or more processors 11 at the same time or successively. One or more chips may also be mounted on processor 11. Note that the program may also be transmitted from a network via a telecommunication line.

Memory 12 is a computer-readable recording medium, and may also be constituted by, for example, at least one of a read only memory (ROM), an erasable programmable ROM (EPROM), an electrically erasable programmable ROM (EEPROM), and a random access memory (RAM). Memory 12 may also be referred to as a register, a cache, a main memory (main storage unit), or the like. Memory 12 can store a program (program code), a software module, and the like that can be executed to perform a flight control method according to an embodiment of the present invention.

Storage 13 is a computer-readable recording medium, and may also be constituted by, for example, at least one of an optical disk such as a compact disc ROM (CD-ROM), a hard disc drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disc, and a magnetic strip. Storage 13 may also be referred to as an auxiliary storage unit.

Communication apparatus 14 is hardware (a transmitting and receiving device) for performing communication with a computer via a wired network and/or a wireless network, and is also referred to as, for example, a network device, a network controller, a network card, a communication module, or the like.

Positioning apparatus 15 measures the three-dimensional position of air vehicle 10. Positioning apparatus 15 is, for example, a global positioning system (GPS) receiver, and measures the current position of air vehicle 10 based on GPS signals received from a plurality of satellites.

Image capturing apparatus 16 captures an image of the surrounding area of air vehicle 10. Image capturing apparatus 16 is a camera for example, and performs image capturing by using an optical system to form an image on an imaging element. Image capturing apparatus 16 captures, for example, an image of a predetermined range forward of air vehicle 10. Note, however, that the direction in which image capturing apparatus 16 captures an image is not limited to the direction forward of air vehicle 10, and may also be a direction upward, downward, or backward of air vehicle 10. Furthermore, the image capture direction may also be changed, for example, by rotation of a pedestal that supports image capturing apparatus 16.

Furthermore, the apparatuses such as processor 11 and memory 12 are connected to each other via bus 17 for communicating information. Bus 17 may be constituted by a single bus, or may be constituted by buses that are different from each other between the apparatuses.

Figure 4:
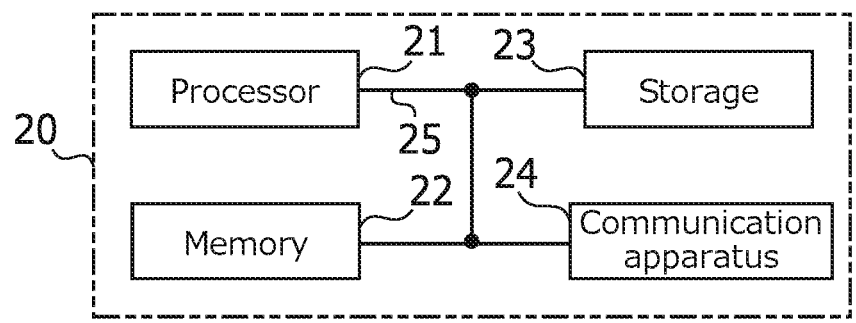
FIG. 4 is a diagram showing a hardware configuration of server apparatus 20, in accordance to the present invention.

FIG. 4 is a diagram showing a hardware configuration of server apparatus 20. Server apparatus 20 functions to perform operation management with respect to air vehicle 10. The term "operation management" means managing air traffic of air vehicle 10. For example, if air vehicle 10 is an unmanned aerial vehicle such as a drone, the operation management includes setting of a flight airspace of air vehicle 10 and control of a flight path. Note, however, that "operation management" is an idea that can encompass not only management of such an unmanned aerial vehicle but also air traffic management of a manned aircraft, namely, keeping track of and performing notification of the entire airspace in which the manned aircraft flies, for example.

Server apparatus 20 may also be physically constituted by a computer device that includes processor 21, memory 22, storage 23, communication apparatus 24, bus 25, and the like. Processor 21, memory 22, storage 23, communication apparatus 24, and bus 25 are the same as above-described processor 11, memory 12, storage 13, communication apparatus 14, and bus 17, and thus descriptions thereof are omitted.

Figure 5:
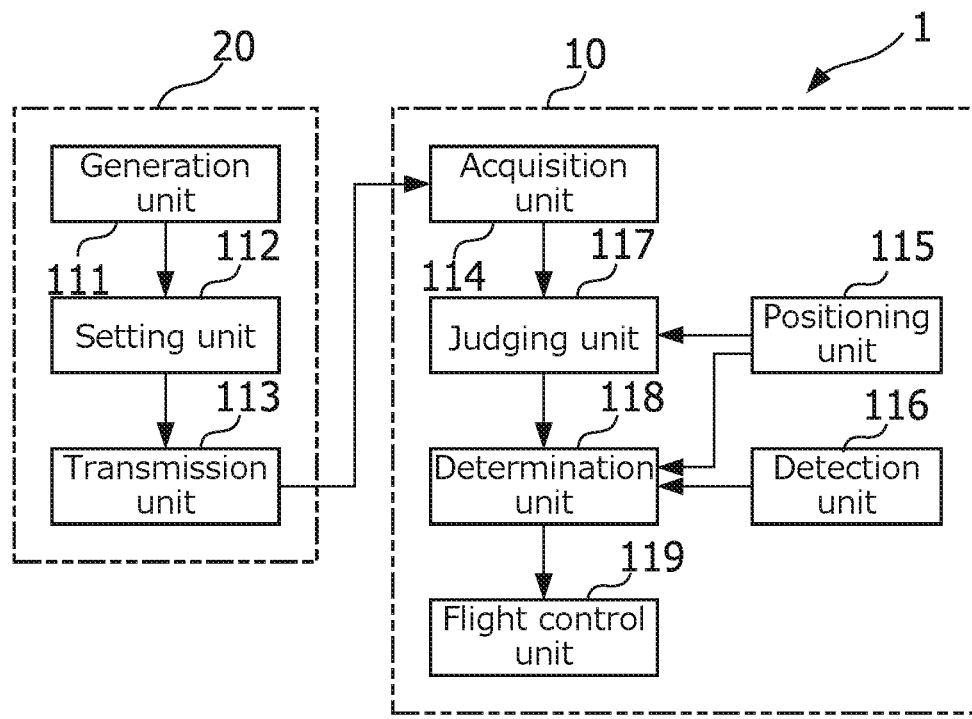
FIG. 5 is a diagram showing an example of a functional configuration of flight control system 1, in accordance to the present invention.

FIG. 5 is a diagram showing an example of a functional configuration of flight control system 1. Flight control system 1 functions as generation unit 111, setting unit 112, transmission unit 113, acquisition unit 114, positioning unit 115, detection unit 116, judging unit 117, determination unit 118, and flight control unit 119. In this example, generation unit 111, setting unit 112, and transmission unit 113 are mounted on server apparatus 20. The functions of server apparatus 20 are realized by reading predetermined software (program) onto hardware such as processor 21 or memory 22 so that processor 21 performs calculation, and controlling communication using communication apparatus 24 and reading and/or writing of data with respect to memory 22 and storage 23. On the other hand, acquisition unit 114, positioning unit 115, detection unit 116, judging unit 117, determination unit 118, and flight control unit 119 are mounted on air vehicle 10. The functions of air vehicle 10 are realized by reading predetermined software (program) onto hardware such as processor 11 or memory 12 so that processor 11 performs calculation, and controlling communication using communication apparatus 14 and reading and/or writing of data with respect to memory 12 and storage 13. In this case, air vehicle 10 functions as a flight control apparatus.

Generation unit 111 generates flight plan 121 for air vehicle 10. This flight plan 121 means information indicating a flight plan. Flight plan 121 includes first flight conditions. Flight conditions means conditions that air vehicle 10 should follow when it flies. The flight conditions are used in flight control of air vehicle 10.

Setting unit 112 sets time limits with respect to positions on a path along which air vehicle 10 is to fly. The time limits refer to time ranges in which or times at which the positions on the path are to be arrived at. Setting unit 112 may also set time limits based on the flight performance of air vehicle 10 and the statuses of airspaces in which air vehicle 10 is to fly. The reason why the statuses of airspaces are taken into consideration when time limits are set is that there is a possibility that air vehicle 10 cannot sufficiently demonstrate the flight performance depending on the status of the airspace.

Transmission unit 113 transmits flight plan 121 generated by generation unit 111 and information indicating the time limit set by setting unit 112 to air vehicle 10. Acquisition unit 114 acquires flight plan 121 and the information indicating the time limit that were transmitted by transmission unit 113. The information indicating the time limit may also be included in flight plan 121.

Positioning unit 115 measures the position of air vehicle 10. Positioning unit 115 is realized by, for example, above-described positioning apparatus 15. Detection unit 116 detects an object that is present within a predetermined range from air vehicle 10. By performing, for example, image recognition processing on an image captured by image capturing apparatus 16, detection unit 116 detects an object present within a predetermined range from air vehicle 10. The object is an obstacle that will hinder flight, such as another air vehicle 10, a bird, a natural object, or a building.

Judging unit 117 judges whether or not air vehicle 10 has arrived at a corresponding position within a time limit, based on the information acquired by acquisition unit 114. Air vehicle 10 has a timer function. Judging unit 117 may also perform the judgment based on the position measured by positioning unit 115 and the current time measured by the timer function, for example.

If it is judged by judging unit 117 that air vehicle 10 has not arrived at the corresponding position within the time limit, determination unit 118 determines a second flight condition. The state in which the corresponding position has not been arrived at within the time limit refers to a state in which air vehicle 10 has not arrived at the corresponding position within the time limit. In other words, the state in which the corresponding position has not been arrived at within the time limit refers to a state in which when the time limit is reached, air vehicle 10 is located on the side, closer to departure point P1, of the position on the path at which the time limit is set.

Flight control unit 119 controls the flight of air vehicle 10 by performing switching between first flight control, which follows the first flight conditions described in flight plan 121, and second flight control, which follows the second flight condition determined by determination unit 118, according to the judgment result obtained by judging unit 117. For example, if it is judged by judging unit 117 that air vehicle 10 has arrived at the corresponding position within the time limit, flight control unit 119 may also control the flight of air vehicle 10 based on the first flight conditions described in flight plan 121. On the other hand, if it is judged by judging unit 117 that air vehicle 10 has not arrived at the corresponding position within the time limit, flight control unit 119 may also control the flight of air vehicle 10 based on the second flight condition determined by determination unit 118.

Note that, in the following description, if air vehicle 10 is described as the subject of processing, it is meant that the processing is executed specifically by reading predetermined software (program) onto hardware such as processor 11 or memory 12 so that processor 11 performs calculation, and controlling communication using communication apparatus 14 and reading and/or writing of data with respect to memory 12 and storage 13. The same applies to server apparatus 20.

Operation

Figures 6, 7:
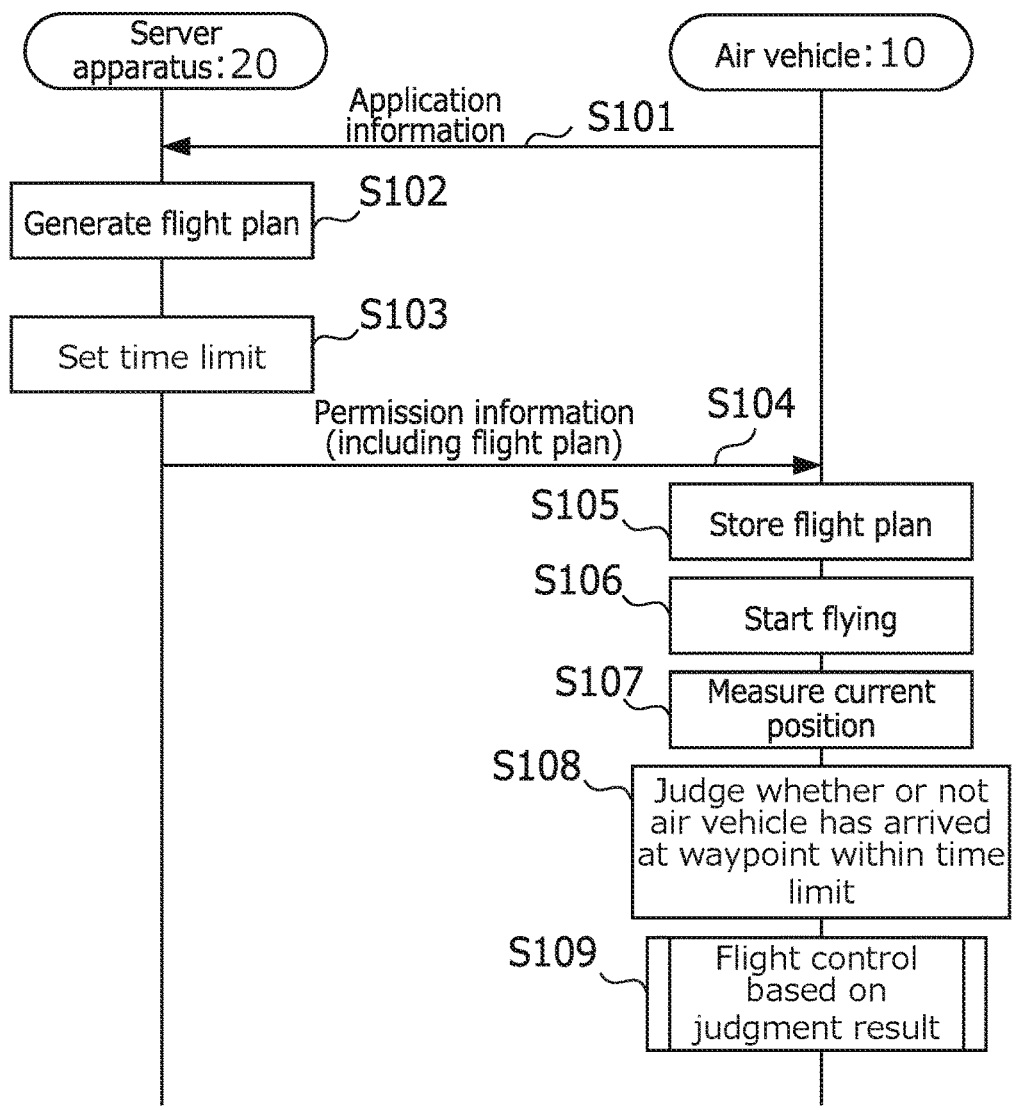
FIG. 6 is a sequence chart showing an example of an operation of flight control system 1, in accordance to the present invention.
FIG. 7 is a diagram showing an example of flight plan 121, in accordance to the present invention.

FIG. 6 is a sequence chart showing an example of an operation of flight control system 1. Processing of step S101 is started before air vehicle 10 flies.

In step S101, air vehicle 10 transmits application information for applying a flight permission. The application information includes, for example, flight conditions such as flight date, a flight path, and a flight altitude.

In step S102, generation unit 111 of server apparatus 20 generates flight plan 121 of air vehicle 10 based on the application information received from air vehicle 10.

FIG. 7 is a diagram showing an example of flight plan 121. Flight plan 121 includes a departure point, a destination point, a waypoint, a waiting location, and a flight path. The departure point is a location from which air vehicle 10 takes off. The destination point is a location set as a destination of the flight of air vehicle 10. The waypoint is a location that air vehicle 10 is to pass through when it flies from the departure point to the destination point. The waiting location is a location at which air vehicle 10 temporarily waits. The flight path is a three-dimensional air route along which air vehicle 10 is to fly.

In this example, flight plan 121 includes departure point P1, destination point P10, waypoints P2 to P8, waiting location P9, and flight path R1. These flight conditions may also be flight conditions included in the application information, or may also be set by server apparatus 20. For example, the flight conditions may also be set based on an attribute of the airspace in which air vehicle 10 is to fly.

FIG. 8 is a diagram showing an example of an airspace. In this example, the airspace is divided into multiple airspace cells C. Each airspace cell C is a three-dimensional space. Airspace cell C has, for example, a tubular shape. Note, however, that the shape of airspace cells C is not limited to a tubular shape, and may also be a shape other than a tubular shape, such as a prismatic column.

An attribute may also be set for airspace cell C. This attribute includes, for example, a flight direction and an airspace type. If, for example, a flight direction toward north from south is set for airspace cell C1, air vehicle 10 can only fly through airspace cell C1 in this flight direction. The airspace type includes, for example, a common airspace and an exclusive airspace. In a common airspace, multiple air vehicles 10 can fly at the same time. On the other hand, in an exclusive airspace, only one air vehicle 10 can fly at a time. For example, if airspace cell C1 is set as an exclusive airspace and is assigned to one air vehicle 10 from 13:00 to 15:00, another air vehicle 10 cannot pass through airspace cell C1 in this time span. Above-described flight path R1 may also be set in view of such an attribute of airspace cell C.

FIG. 9 is a diagram showing an example of flight path R1. Flight path R1 is a path extending from departure point P1 to destination point P10 via waypoints P2 to P8. Also, waiting location P9 is located in the vicinity of destination point P10. When flight path R1 is set, airspace cells C1 to Cn on flight path R1 are assigned to air vehicle 10. Alternatively, flight path R1 itself may also be expressed as successive airspace cells C. Furthermore, at least some of departure point P1, waypoints P2 to P8, waiting location P9, and destination point P10 may also be expressed by airspace cells C.

In step S103, setting unit 112 of server apparatus 20 sets time limits with respect to waypoints P2 to P8 described in flight plan 121. The time limits include flight time and extra time. The flight time is set based on the flight performance of air vehicle 10. For example, the flight time may also be calculated using the flight distances between waypoints P2 to P8 and the flight speed of air vehicle 10. The extra time is set based on, for example, the statuses of surrounding airspaces of waypoints P2 to P8. The statuses of the airspaces include, for example, a congestion level of air vehicles 10 in the airspaces, or the weather. This congestion level may also be calculated, for example, for respective waypoints P2 to P8, based on the number of air vehicles 10 that are present in a predetermined range of airspaces. For example, if the congestion level of air vehicles 10 is high in a predetermined range from waypoint P2, the extra time for waypoint P2 may also be extended. Accordingly, a longer time limit is to be set with respect to waypoint P2. The weather may also be specified by acquiring weather information from an external system, for example. If, for example, the weather in an airspace within a predetermined range from waypoint P2 is bad, the extra time for waypoint P2 may also be extended. Accordingly, a longer time limit is to be set with respect to waypoint P2. The expression "the weather is bad" refers to a state in which the flight performance of air vehicle 10 cannot be exerted as planned, such as a state in which the amount of rainfall is a predetermined amount or more, or a state in which the wind speed is a predetermined speed or higher, for example.

Furthermore, setting unit 112 describes the time limits set in this way in flight plan 121. In the example shown in FIG. 7, the set time limits are described in flight plan 121 in association with respective waypoints P2 to P8. For example, a time limit "13:30" set for waypoint P2 is described in association with waypoint P2.

In step S104, transmission unit 113 of server apparatus 20 transmits, to air vehicle 10, permission information for permitting a flight. The permission information includes flight plan 121 generated in step S102. Acquisition unit 114 of air vehicle 10 receives the permission information from the server apparatus 20.

In step S105, air vehicle 10 stores flight plan 121 included in the received permission information in storage 13.

In step S106, air vehicle 10 starts flying in accordance with flight plan 121 stored in storage 13. Specifically, flight control unit 119 controls drive apparatuses 102 so that air vehicle 10 flies along flight path R1 described in flight plan 121. As a result of drive apparatuses 102 performing driving under the control of flight control unit 119, propellers 101 rotate and air vehicle 10 flies.

In step S107, positioning unit 115 of air vehicle 10 measures the current position of air vehicle 10 at predetermined time intervals.

In step S108, judging unit 117 of air vehicle 10 judges whether or not the next waypoint among waypoints P2 to P8 has been arrived at within the time limit. Whether or not the next waypoint has been arrived at is specified based on the position measured in step S107. Here, a case is considered in which the next waypoint is waypoint P2. In the example shown in FIG. 7, the time limit "13:30" is set with respect to waypoint P2. In this case, if, when the time limit 13:30 is reached, air vehicle 10 is located at a position at waypoint P2 on flight path R1 or a position between waypoint P2 and destination point P10, it is judged that waypoint P2 has been arrived at within the time limit. On the other hand, if, when the time limit 13:30 is reached, air vehicle 10 is located at a position between waypoint P2 and departure point P1 on flight path R1, it is judged that waypoint P2 has not been arrived at within the time limit.

In step S109, flight control unit 119 of air vehicle 10 performs flight control according to the judgment result obtained in step S108.

FIG. 10 is a diagram showing an example of flight control according to the judgment result. If the next waypoint is arrived at within a time limit, air vehicle 10 flies in accordance with operation management control. The operation management control refers to control of flight in accordance with flight plan 121. The operation management control is an example of the above-described first flight control. On the other hand, if the next waypoint could not be arrived at within a time limit, air vehicle 10 flies in accordance with autonomous control. The autonomous control refers to control of flight based on a flight condition that was determined by air vehicle 10 itself irrespective of flight plan 121. The autonomous control is an example of the above-described second flight control. In this manner, air vehicle 10 switches the flight control method according to whether or not waypoints P2 to P8 have been arrived at within the time limits.

Figure 11:
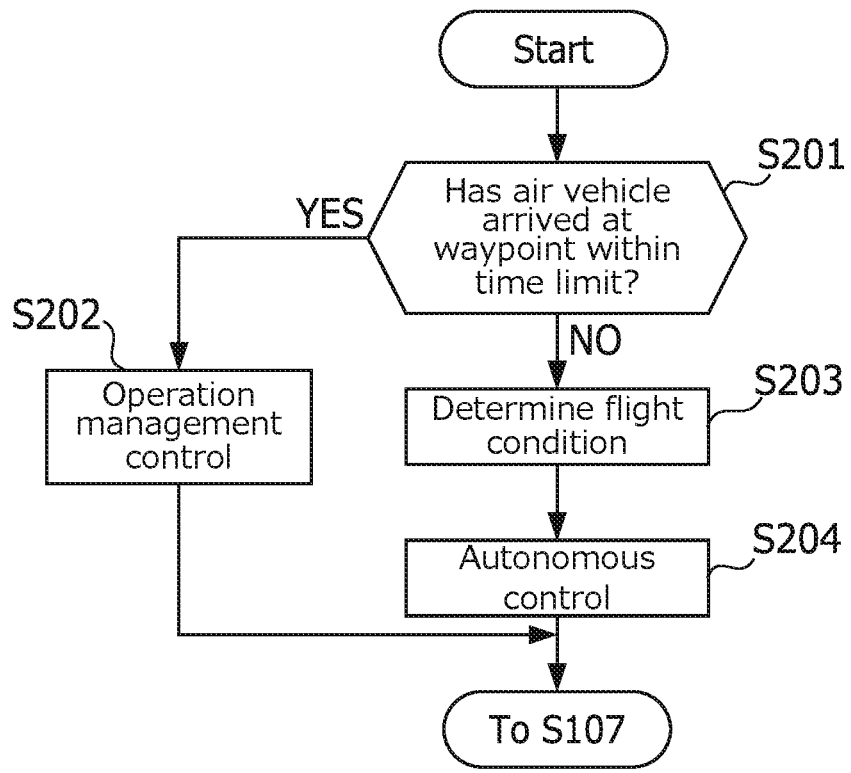
FIG. 11 is a flowchart showing flight control of air vehicle 10, in accordance to the present invention.

FIG. 11 is a flowchart showing flight control of air vehicle 10. The processing shown in FIG. 11 is executed in above-described step S109.

In step S201, air vehicle 10 reads the judgment result obtained in step S108. If the judgment result indicates that the next waypoint has been arrived at within the time limit (YES in step S201), the procedure advances to step S202.

In step S202, flight control unit 119 performs operation management control in accordance with flight plan 121 stored in storage 13. Specifically, flight control unit 119 controls the flight based on all of flight conditions described in flight plan 121. For example, flight control unit 119 performs flight control so that air vehicle 10 passes through flight path R1 described in flight plan 121. With this flight control, air vehicle 10 flies along flight path R2 to destination point P10 via waypoints P2 to P8. During the operation management control, air vehicle 10 does not fly along a path different from flight path R1. Note, however, that air vehicle 10 may also halt or wait, according to a position measured by positioning unit 115 or an obstacle detected by detection unit 116.

On the other hand, if, in above-described step S201, the read judgment result indicates that the next waypoint could not be arrived at within the time limit (NO in step S201), the procedure advances to step S203.

In step S203, determination unit 118 determines new flight conditions based on the position measured by positioning unit 115 and the object detected by detection unit 116. The flight conditions include at least a flight path.

For example, determination unit 118 sets a destination point based on the remaining flight distance to destination point P10. The destination point may be the same as destination point P10 described in flight plan 121, or may be a location that is different from destination point P10. For example, if the remaining flight distance from the position measured in step S107 to destination point P10 satisfies a predetermined condition, determination unit 118 may also set a destination point that is different from destination point P10. For example, if the remaining flight distance is larger than half of the flight distance between departure point P1 and destination point P10, departure point P1 described in flight plan 121 may also be set as the destination point. In this case, the destination point for air vehicle 10 will be changed from destination point P10. On the other hand, if the remaining flight distance does not satisfy the predetermined condition, determination unit 118 does not need to change destination point P10. For example, if the remaining flight distance is less than or equal to half of the flight distance between departure point P1 and destination point P10, destination point P10 described in flight plan 121 may also remain as set.

Furthermore, determination unit 118 determines a flight path directed toward the destination point based on the position measured by positioning unit 115 and the object detected by detection unit 116. For example, if departure point P1 is set as a destination point, determination unit 118 determines flight path R2, which is directed toward departure point P1 from the position measured by positioning unit 115, while avoiding collision with the object detected by detection unit 116. In this case, flight path R1 is an example of a first path, and flight path R2 is an example of a second path. As shown in FIG. 9, the flight path R2 is basically a path that is different from flight path R1 described in flight plan 121. Note, however, that flight path R2 may also be at least partially the same as flight path R1 in some situations.

Furthermore, if there are a plurality of flight path candidates, determination unit 118 may also determine one flight path from among the plurality of flight path candidates, based on the type of an airspace cell C. For example, determination unit 118 may also determine a flight path that passes through a common airspace cell C. The common airspace cell C is an example of a predetermined airspace. At this time, the reason why a flight path that passes through a common airspace cell C instead of an exclusive airspace cell C is determined is that if one air vehicle 10 enters an exclusive airspace cell C that has been assigned to another air vehicle 10, there is a possibility that these air vehicles 10 will collide with each other.

In step S204, flight control unit 119 performs autonomous control based on the flight conditions determined in step S203. For example, flight control unit 119 performs flight control so that air vehicle 10 flies along flight path R2 determined in above-described step S203. With this flight control, air vehicle 10 flies along flight path R2 to departure point P1.

After the processing in step S202 or S204 is complete, the procedure returns to above-described step S107, and the processing of step S107 and onwards is repeated. Note, however, that if the processing of step S204 is executed, step S204 may also be ended without returning to step S107.

According to the above-described embodiment, time limits are set with respect to waypoints P2 to P8. If, for example, an airspace cell C on flight path R1 is assigned to air vehicle 10 only for a predetermined time period, there may be a case where, upon elapse of the predetermined time period, subsequent air vehicle 10 flies along at least part of flight path R1. In such a case, if air vehicle 10 cannot arrive at the next waypoint within the time limit, and continues to fly along flight path R1 described in flight plan 121, air vehicle 10 may collide with subsequent air vehicle 10. However, according to the above-described embodiment, if air vehicle 10 could not arrive at the next waypoint within the time limit, air vehicle 10 flies in accordance with autonomous control without using flight plan 121. At this time, air vehicle 10 will fly along a new flight path R2, which is different from flight path R1 described in flight plan 121, for example. Accordingly, the likelihood that air vehicle 10 may collide with subsequent air vehicle 10 is reduced, and the influence on subsequent air vehicle 10 is reduced.

If the next waypoint has been arrived at within the time limit, air vehicle 10 flies in accordance with flight plan 121 received from server apparatus 20. In this case, since air vehicle 10 does not need to perform autonomous control, the burden of processing of air vehicle 10 is mitigated and the power consumption is also suppressed.

Modifications

The present invention is not limited to the above-described embodiment. The above-described embodiment may also be modified in the following manner. Furthermore, two or more modifications below may also be executed in combination.

In the above-described embodiment, determination unit 118 may also set a destination point according to a priority level added based on the flight purpose. In this case, flight plan 121 includes a priority level added based on the flight purpose. For example, if air vehicle 10 flies in order to deal with an incident or an accident, a high priority level may also be set for the flight purpose of air vehicle 10. For example, if the priority level is a predetermined degree or higher, determination unit 118 may also keep destination point P10 described in flight plan 121 as is without changing it. This is because if a high priority level is set for the flight purpose of air vehicle 10, it is thought that it is important for air vehicle 10 to arrive at destination point P10.

Furthermore, in this case, setting unit 112 may also set a time limit according to the priority level described in flight plan 121. For example, setting unit 112 may also extend the time limit the higher the priority level is. Furthermore, setting unit 112 may also set, for the highest priority level, an infinite time limit, that is, setting unit 112 does not need to set a time limit. This is because if a higher priority level is set for the flight purpose of air vehicle 10, it is thought that it is important for air vehicle 10 to arrive at destination point P10 irrespective of a time limit.

In the above-described embodiment, determination unit 118 may also set a predetermined waiting location as the destination point. In this case, the predetermined waiting location is described in flight plan 121. Air vehicle 10 flies toward the predetermined waiting location. Upon arriving at the predetermined waiting location, air vehicle 10 may also wait while staying aloft until a new operation management instruction is received from server apparatus 20, for example. In this case, upon receiving an operation management instruction from server apparatus 20, air vehicle 10 may also fly in accordance with the received operation management instruction.

The flight conditions included in flight plan 121 are not limited to the examples described in the above-described embodiment. For example, flight plan 121 may also include only some of a departure point, a destination point, a waypoint, a waiting location, and a flight path. In another example, flight plan 121 may also include another flight condition regarding a flight distance, or another flight condition regarding a flight time or a flight speed. The flight condition regarding the flight time may also be, for example, a scheduled departure time, a scheduled arrival time, or a waypoint passage time. The flight condition regarding the flight speed may also be, for example, a flight speed or an average flight speed.

For example, flight plan 121 does not need to include a flight path. In this case, when operation management control is performed, air vehicle 10 determines a flight path directed toward destination point P10 via waypoints P2 to P8 described in flight plan 121, and flies along the determined flight path.

In the above-described embodiment, time limits may also be set with respect to positions other than waypoints P2 to P8 on flight path R1. For example, a time limit may also be set with respect to destination point P10. In another example, time limits may also be set with respect to respective airspace cells C on flight path R1.

In the above-described embodiment, the method for measuring the position of air vehicle 10 is not limited to a method using a GPS. The position of air vehicle 10 may also be measured by a method in which a GPS is not used.

In the above-described embodiment, the method for detecting an object that is present within a predetermined range from air vehicle 10 is not limited to a method using an image captured by image capturing apparatus 16. For example, a radar may also be used to detect an object that is present within a predetermined range from air vehicle 10.

In the above-described embodiment, air vehicle 10 may also have at least some of the functions of server apparatus 20. Similarly, server apparatus 20 may also have at least some of the functions of air vehicle 10.

The present invention may also be provided as a flight control method that includes processing steps that are executed in flight control system 1. Furthermore, the present invention may also be provided as a program that is executed in air vehicle 10 or server apparatus 20.

The block diagram of FIG. 5 shows blocks per functional units. These functional blocks (configuration units) are realized by an arbitrary combination of hardware and/or software. Furthermore, means for realizing the functional blocks is not particularly limited. In other words, the functional blocks may also be realized by one physically and/or logically coupled apparatus, or a plurality of apparatuses obtained by directly and/or indirectly (for example, in a wired and/or wireless manner) connecting two or more apparatuses that are physically and/or logically separated.

The hardware configuration of air vehicle 10 or server apparatus 20 may also be configured to include one or more apparatuses shown in FIG. 3 or 4, or may also be configured not to include some apparatuses. Furthermore, air vehicle 10 or server apparatus 20 may also be configured to include hardware such as a microprocessor, a DSP (Digital Signal Processor), an ASIC (Application Specific Integrated Circuit), a PLD (Programmable Logic Device), or an FPGA (Field Programmable Gate Array), and some or all of the functional blocks of air vehicle 10 or server apparatus 20 may also be realized by the hardware. For example, processor 11 or 21 may also be implemented by at least one of these pieces of hardware.

Notification of information is not limited to the aspects/embodiments explained in the present description, and may also be performed by another method. For example, notification of information may also be performed by physical layer signaling (for example, downlink control information (DCI) or uplink control information (UCI)), higher-level layer signaling (for example, radio resource control (RRC) signaling, medium access control (MAC) signaling, broadcast information (master information block (MIB) or system information block (SIB))), and other signals, or a combination thereof. Furthermore, RRC signaling may also be referred to as an RRC message, and may also be, for example, an RRC Connection Setup message, an RRC Connection Reconfiguration) message, or the like.

The aspects/embodiments explained in the present description may also be applied to a system using Long Term Evolution (LTE), LTE-Advanced (LTE-A), SUPER3G, IMT-Advanced, 4G, 5G, Future Radio Access (FRA), W-CDMA (registered trademark), GSM (registered trademark), CDMA2000, Ultra Mobile Broadband (UMB), IEEE802.11 (Wi-Fi), IEEE802.16 (WiMAX), IEEE802.20, Ultra-Wide Band (UWB), Bluetooth (registered trademark) or another appropriate system, and/or a next-generation system expanded based on them.

The orders of the processing procedure, sequence, flowchart, and the like of the aspects/embodiments described in the present description may be changed unless they contradict each other. For example, the methods explained in the present description show various step elements in an exemplified order, and are not limited to the shown specific order.

Information and the like may be output from a higher-level layer (or a lower-level layer) to a lower-level layer (or a higher-level layer). Information and the like may also be input/output via a plurality of network nodes.

Input/output information and the like may also be stored in a specific location (for example, a memory), or may also be managed in a management table. Information and the like to be input/output may be overwritten, updated, or added. Output information and the like may also be deleted. Input information and the like may also be transmitted to another apparatus.

Judging may also be conducted using a value expressed by a single bit (0 or 1) or a truth-value (Boolean: true or false), or by comparing numerical values (for example, comparing a value with a predetermined value).

The aspects/embodiments explained in the present description may also be used alone or in combination, or may also be switched when they are implemented. Furthermore, notification of predetermined information (for example, notification of "being X") is not limited to being performed explicitly, and may also be performed implicitly (for example, notification of the predetermined information is not performed).

Software should be broadly interpreted to mean an instruction, an instruction set, a code, a code segment, a program code, a program, a sub program, a software module, an application, a software application, a software package, a routine, a subroutine, an object, an executable file, an execution thread, a procedure, a function and the like, regardless of whether it is referred to as software, firmware, middleware, a microcode, a hardware description language, or another name.

Furthermore, software, an instruction, and the like may also be transmitted/received via a transmission medium. For example, if software is transmitted from a web site, a server, or another remote source, using a wired technology such as a coaxial cable, an optical fiber cable, a twist pair, and a digital subscriber line (DSL), and/or a wireless technology such as infrared light, a radio wave, and a microwave, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned over the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

The terms "system" and "network" used in the present description can be used in an interchangeable manner.

Furthermore, the information and the parameters explained in the present description may also be expressed by absolute values, relative values from a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are in no way limiting.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The terms "connected" and "coupled", or any form thereof mean any type of direct or indirect connection or coupling between two or more elements, and may include a case where one or more intermediate elements are present between two elements that are "connected" or "coupled" to each other. The elements may be subjected to physical coupling or connection, logical coupling or connection, or a combination of physical and logical coupling/connection. Two elements, when used in the present description, can be thought of as being "connected" or "coupled" to each other by using one or more wires, cables, and/or printed electric connections, and using electromagnetic energy such as electromagnetic energy having a wavelength in a radio frequency range, a micro wave range, and a light (both visible light and invisible light) range, as some non-limiting and incomprehensive examples.

The term "based on" used in the present description does not mean "based on only", unless otherwise noted. In other words, the term "based on" means both terms "based on only" and "based on at least".

Any reference to the elements using designations such as "first" and "second" used in the present description does not limit, in general, the amount or order thereof. These nominal signs can be used in the present description as a convenient method for distinguishing between two or more elements. Accordingly, reference to first and second elements does not mean that only two elements can be used here, or that the first element should precede the second element somehow.

The "means" in the configurations of the above-described apparatuses may be replaced by "units", "circuit", "device", or the like.

The terms "including", "comprising", and any form thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

REFERENCE SIGNS LIST

1 Flight control system
10 Air vehicle
20 Server apparatus
111 Generation unit
112 Setting unit
113 Transmission unit
114 Acquisition unit
115 Positioning unit
116 Detection unit
117 Judging unit
118 Determination unit
119 Flight control unit

What is claimed is:
1. A flight control apparatus comprising:
a processor configured to:
  acquire a flight plan of an air vehicle in which first flight conditions are included, and information that indicates a time limit set with respect to a position on a path along which the air vehicle is to fly, wherein the air vehicle is unmanned;
  judge, based on the acquired information, whether the air vehicle has arrived at the position within the time limit;
  determine a second flight condition if it is judged that the air vehicle has not arrived at the position within the time limit; and
  control flight of the air vehicle by selectively adopting a first flight control method which follows the first flight conditions or a second flight control method which follows the second flight condition based on whether the air vehicle has arrived at the position within the time limit.

2. The flight control apparatus according to claim 1,
wherein the flight plan of the air vehicle further includes a first path and a destination point, and
wherein the processor is further configured to:
determine a second path directed toward the destination point, the second path being different from the first path.

3. The flight control apparatus according to claim 1,
wherein the flight plan of the air vehicle further includes a destination point, and
wherein the processor is further configured to:
determine a path that passes through a predetermined airspace from among a plurality of paths directed toward the destination point.

4. The flight control apparatus according to claim 2,
wherein the flight plan of the air vehicle further includes a destination point, and
wherein the processor is further configured to:
determine a path that passes through a predetermined airspace from among a plurality of paths directed toward the destination point.

5. The flight control apparatus according to claim 1,
wherein the flight plan of the air vehicle includes a destination point, and
wherein the processor is further configured to:
if a predetermined condition is satisfied, change the destination point and determines a new path directed toward the changed destination point.

6. The flight control apparatus according to claim 5,
wherein the processor is further configured to:
measure a position of the air vehicle,
wherein the flight plan of the air vehicle includes a priority level that is added according to a flight purpose, and
the predetermined condition is represented by a distance between the position or a condition relating to the priority level.

7. A flight control system comprising:
a processor of a server configured to:
set a time limit with respect to a position on a path along which the air vehicle is to fly; and
a processor of an air vehicle configured to:
acquire a flight plan of the air vehicle in which first flight conditions are included, and information that indicates the set time limit;
judge, based on the acquired information, whether or not the air vehicle has arrived at the position within the time limit;
determine a second flight condition if it is judged that the air vehicle has not arrived at the position within the time limit; and
control flight of the air vehicle by selectively adopting a first flight control method which follows the first flight conditions or a second flight control method which follows the second flight condition based on whether the air vehicle has arrived at the position within the time limit.

8. The flight control system according to claim 7,
wherein the processor of the server sets the time limit based on flight performance of the air vehicle and a status of an airspace in which the air vehicle is to fly.

9. The flight control system according to claim 7,
wherein the flight plan of the air vehicle further includes a first path and a destination point, and
wherein the processor is further configured to:
determine a second path directed toward the destination point, the second path being different from the first path.

10. The flight control system according to claim 7,
wherein the flight plan of the air vehicle further includes a destination point, and
wherein the processor is further configured to:
determine a path that passes through a predetermined airspace from among a plurality of paths directed toward the destination point.

11. The flight control system according to claim 9,
wherein the flight plan of the air vehicle further includes a destination point, and
wherein the processor is further configured to:
determine a path that passes through a predetermined airspace from among a plurality of paths directed toward the destination point.

12. The flight control system according to claim 7,
wherein the flight plan of the air vehicle includes a destination point, and
wherein the processor is further configured to:
if a predetermined condition is satisfied, change the destination point and determines a new path directed toward the changed destination point.

13. The flight control system according to claim 12,
wherein the processor is further configured to:
measure a position of the air vehicle,
wherein the flight plan of the air vehicle includes a priority level that is added according to a flight purpose, and
the predetermined condition is represented by a distance between the position or a condition relating to the priority level.

14. The flight control system according to claim 7,
wherein the first control method includes operating the air vehicle according to the operation management control and the second control method includes operating the air vehicle autonomous control.

15. The flight control system according to claim 14,
wherein the operation management control includes operating according to the flight plan, and the air vehicle autonomous control includes operating according to a flight condition determined by the air vehicle irrespective of the flight plan.

16. The flight control system according to claim 7,
wherein the second control method includes autonomously controlling the flight of the air vehicle based on a flight condition determined by the air vehicle irrespective of the flight plan.

17. The flight control apparatus according to claim 1,
wherein the first control method includes operating the air vehicle according to the operation management control and the second control method includes operating the air vehicle autonomous control.

18. The flight control apparatus according to claim 17,
wherein the operation management control includes operating according to the flight plan, and the air vehicle autonomous control includes operating according to a flight condition determined by the air vehicle irrespective of the flight plan.

19. The flight control apparatus according to claim 1,
wherein the second control method includes controlling the flight of the air vehicle based on a flight condition determined by the air vehicle irrespective of the flight plan.

20. The flight control apparatus according to claim 1, wherein the second control method includes the air vehicle autonomously controlling the flight of the air vehicle.

\* \* \* \* \*